(12) United States Patent
Elias et al.

(10) Patent No.: US 10,915,154 B1
(45) Date of Patent: Feb. 9, 2021

(54) RAISING MAXIMAL SILICON DIE TEMPERATURE USING RELIABILITY MODEL

(71) Applicant: MELLANOX TECHNOLOGIES TLV LTD., Raanana (IL)

(72) Inventors: George Elias, Tel Aviv (IL); Ido Bourstein, Pardes Hana-Karkur (IL); Lior Abramovsky, Haifa (IL); Lavi Koch, Tel Aviv (IL)

(73) Assignee: MELLANOX TECHNOLOGIES TLV LTD., Raanana (IL)

( * ) Notice: Subject to any disclaimer, the term of this patent is extended or adjusted under 35 U.S.C. 154(b) by 18 days.

(21) Appl. No.: 16/535,093

(22) Filed: Aug. 8, 2019

(51) Int. Cl.
*G05B 13/04* (2006.01)
*G06F 1/20* (2006.01)

(52) U.S. Cl.
CPC ........... *G06F 1/206* (2013.01); *G05B 13/042* (2013.01)

(58) Field of Classification Search
CPC .................................................. G05B 13/042
USPC ....................................................... 700/299
See application file for complete search history.

(56) References Cited

U.S. PATENT DOCUMENTS

| | | | |
|---|---|---|---|
| 5,533,198 A | 7/1996 | Thorson | |
| 6,918,063 B2 | 7/2005 | Ho et al. | |
| 7,062,304 B2 | 6/2006 | Chauvel et al. | |
| 7,574,321 B2 | 8/2009 | Kernahan et al. | |
| 9,009,648 B2 | 4/2015 | Kumar et al. | |
| 10,095,286 B2 | 10/2018 | Kumar | |
| 10,404,574 B2 | 9/2019 | Zdornov et al. | |
| 2002/0029287 A1 | 3/2002 | Yemini et al. | |
| 2003/0074173 A1 | 4/2003 | Monroe | |
| 2006/0242447 A1* | 10/2006 | Radhakrishnan ... | G06F 13/1668 713/501 |
| 2013/0046999 A1* | 2/2013 | Jung ....................... | G06F 1/206 713/300 |
| 2014/0022002 A1* | 1/2014 | Chua-Eoan ............. | H01L 35/00 327/512 |
| 2014/0105246 A1* | 4/2014 | Andreev .................. | G06F 1/206 374/178 |
| 2015/0263994 A1* | 9/2015 | Haramaty ............. | H04L 47/283 370/412 |

(Continued)

FOREIGN PATENT DOCUMENTS

EP 2662778 A1 11/2013

OTHER PUBLICATIONS

Chen et al, Approach to Extrapolating Reliability of Circuits Operating in a Varying and Low Temperature Range, 2006, IEEE, pp. 6 (Year: 2006).*

(Continued)

*Primary Examiner* — Suresh Suryawanshi
(74) *Attorney, Agent, or Firm* — Kligler & Associates Patent Attorneys Ltd

(57) ABSTRACT

A method includes obtaining (i) an operating-temperature profile of a hardware processing sub-unit (HPSU) of a network element as a function of time, and (ii) a dependence of an Equivalent Reliability Time (ERT) of the HPSU on operating temperature. The operating-temperature profile is weighted using the dependence of the ERT on operating temperature, to estimate an effective ERT of the HPSU. An operating condition of the HPSU in the network element is modified, depending on the effective ERT.

35 Claims, 3 Drawing Sheets

(56) References Cited

U.S. PATENT DOCUMENTS

2018/0145881 A1   5/2018 Zdornov et al.

OTHER PUBLICATIONS

Chen et al, Design for ASIC Reliability for Low-Temperature Applications, 2006, IEEE, pp. 8 (Year: 2006).*
Seitz et al., "The architecture and programming of the Ametek series 2010 multicomputer", C3P Proceedings of the 3rd Conference on Hypercube concurrent computers and applications: Architecture, software, computer systems, and general issues, vol. 1, pp. 33-36, Pasadena, USA, Jan. 19-20, 1988.
Dally et al., "Deadlock-free message routing in multiprocessor interconnection networks", IEEE Transactions on Computers, vol. C-36, issue 5, pp. 547-553, May 1987.
Glass et al., "The turn model for adaptive routing", Proceedings of the 19th annual international symposium on Computer architecture (ISCA '92), pp. 278-287, Queensland, Australia, May 19-21, 1992.
Underwood et al., "A unified algorithm for both randomized deterministic and adaptive routing in torus networks", IEEE International Symposium on Parallel and Distributed Processing Workshops and Phd Forum (IPDPSW), pp. 723-732, May 16-20, 2011.
Sancho et al., "Analyzing the Influence of Virtual Lanes on the Performance of InfiniBand Networks", Proceedings of the International Parallel and Distributed Processing Symposium, pp. 1-10, year 2002.
Shim et al., "Static Virtual Channel Allocation in Oblivious Routing", 3rd ACM/IEEE International Symposium on Networks-on-Chip, pp. 1-6, May 10-13, 2009.
Domke et al., "Deadlock-Free Oblivious Routing for Arbitrary Topologies", Proceedings of the 2011 IEEE International Parallel & Distributed Processing Symposium (IPDPS '11), pp. 616-627, May 16-20, 2011.
Upadhyay et al., "Routing Algorithms for Torus Networks", International Conference on High Performance Computing, New Delhi, India, pp. 1-6, Dec. 27-30, 1995.
Scheideler, C., "Basic routing theory I—Oblivious routing", The Johns Hopkins University, Theory of Network Communication, Lecture 3, pp. 1-8, Sep. 23-25, 2002.
Singh et al., "Locality-Preserving Randomized Oblivious Routing on Torus Networks", Proceedings of the 14th Annual ACM Symposium on Parallel Algorithms and Architectures, pp. 9-13, Aug. 10-13, 2002.
Dally et al., "Deadlock-free adaptive routing in multicomputer networks using virtual channels", IEEE Transactions on Parallel and Distributed Systems, vol. 4, Issue 4, pp. 466-475, Apr. 1, 1993.

* cited by examiner

- Fan failure
- Ambient temperature peak
- Data traffic peak

RAISING MAXIMAL SILICON DIE TEMPERATURE USING RELIABILITY MODEL

FIELD OF THE INVENTION

The present invention relates generally to thermal management of semiconductor devices, and particularly to thermal management of semiconductor devices of a network switch.

BACKGROUND OF THE INVENTION

Methods for thermally managing semiconductor devices have been previously reported in the patent literature. For example, U.S. Pat. No. 7,062,304 describes a multiprocessor system that includes a plurality of processing modules, such as microprocessor units, co-processors and digital signal processors. Power management software in conjunction with profiles for the various processing modules and the tasks to executed are used to build scenarios which meet predetermined power objectives, such as providing maximum operation within package thermal constraints or using minimum energy. Actual activities associated with the tasks are monitored during operation to ensure compatibility with the objectives. The allocation of tasks may be changed dynamically to accommodate changes in environmental conditions and changes in the task list. Temperatures may be computed at various points in the multiprocessor system by monitoring activity information associated with various sub-systems. The activity measurements may be used to compute a current power dissipation distribution over the die. If necessary, the tasks in a scenario may be adjusted to reduce power dissipation. Further, activity counters may be selectively enabled for specific tasks in order to obtain more accurate profile information.

As another example, U.S. Patent Application Publication 2003/0074173 describes a method for relating expected frequencies and magnitudes of temperature variations encountered by a package/chip device over a product lifetime to parameters of an accelerated life test used to assess reliability. Expected frequencies and magnitudes of temperature fluctuations of a given package/chip device are quantified in each of a plurality of temperature fluctuation regimes. The quantified expected frequencies and magnitudes of the temperature fluctuations of the package/chip device in each of the temperature regimes are incorporated into an accelerated life model in which parameters of the accelerated life test are related to the frequencies and magnitudes of the temperature fluctuations in each of the temperature fluctuation regimes.

U.S. Pat. No. 10,095,286 describes a method and apparatus of a device that manages a thermal profile of a device by selectively throttling central processing unit operations of the device is described. The device manages a thermal profile of the device by adjusting a throttling a central processing unit execution of a historically high energy consuming task. In this embodiment, the device monitors thermal level of the thermal profile of the device, the device is executing a plurality of tasks that utilize a plurality of processing cores of the device. If the thermal level of the device exceeds a thermal threshold, the device identifies one of the plurality of tasks as a historically high energy consuming task, and throttles this historically high energy consuming task by setting a force idle execution time for the historically high energy consuming task. The device further executes the plurality of tasks.

U.S. Pat. No. 7,574,321 describes Electrical components which substantially dissipate the power provided them in the form of heat will change temperature in response to self-heating, heat transfer to their surroundings, and heat transferred from one component to another. A method is disclosed for calculating the temperature of a component(s) using a thermal model. In one embodiment the power dissipation of each component is controlled to limit the temperature of the component. In one embodiment the temperature of a component is modified by changing the power dissipation of another component. In some embodiments the power dissipation of a component is modified by modifying its performance. In another embodiment power dissipation is modified by selecting one or more programs for modified execution.

SUMMARY OF THE INVENTION

An embodiment of the present invention provides a method including obtaining (i) an operating-temperature profile of a hardware processing sub-unit (HPSU) of a network element as a function of time, and (ii) a dependence of an Equivalent Reliability Time (ERT) of the HPSU on operating temperature. The operating-temperature profile is weighted using the dependence of the ERT on operating temperature, to estimate an effective ERT of the HPSU. An operating condition of the HPSU in the network element is modified, depending on the effective ERT.

In some embodiments, modifying the operating condition includes modifying an amount of the communication traffic assigned for processing by the HPSU.

In some embodiments, modifying the operating condition includes modifying an intensity of cooling applied to the HPSU. In other embodiments, modifying the operating condition is performed during a design of the network element.

In some embodiments, modifying the operating condition includes changing a requirement in the design. In other embodiments, modifying the operating condition is performed during field operation of the network element.

In an embodiment, the HPSU is located at a given region of a semiconductor die inside the network element.

In another embodiment, obtaining the operating-temperature profile of the HPSU includes deriving an operating-temperature profile dependent on the profile of the data traffic rate between a port of the network element and the HPSU.

In some embodiments, modifying an operating condition of the HPSU in the network element, depending on the effective ERT, includes: (i) comparing the effective ERT to a prespecified effective ERT, and (ii) if the effective ERT is higher than the prespecified ERT by more than a given tolerance, performing at least one of increasing a maximally allowed data traffic rate between a port of the network element and the HPSU and decreasing a cooling capacity to the semiconductor die, and (iii) if the effective ERT is lower than the prespecified ERT by more than the given tolerance, performing at least one of decreasing the a maximally allowed data traffic rate between the port and the HPSU and increasing a cooling capacity to the semiconductor die.

In some embodiments, increasing the maximally allowed data traffic rate between the port and the HPSU includes operating the HPSU at an increased semiconductor die temperature value.

In an embodiment, obtaining the operating-temperature profile of the HPSU includes deriving the operating-temperature profile from a log of ambient events that each causes a documented variation in the operating temperature.

In another embodiment, the log of ambient events includes a log of ambient temperature and a log of periods of fan-failures.

In some embodiments, obtaining the dependence of the ERT of the HPSU on operating temperature includes applying a relation that converts semiconductor die temperature to ERT.

In other embodiments, obtaining the operating-temperature profile of the HPSU includes monitoring an actual die-temperature profile at a given region of a semiconductor die.

In an embodiment, the method further includes alerting a user if the effective ERT is lower than a pre-specified ERT.

In another embodiment, the method further includes, in response to the effective ERT, running an algorithm configured to identify at least one malfunctioning component of the network element.

In some embodiments, the method further includes: (a) measuring an actual temperature over time during field operation, (b) extrapolating in time an actual temperature profile, (c) based on the extrapolated temperature profile, recalculating the effective ERT, and (d) based on the recalculated ERT, modifying the operating condition of the HPSU.

There is additionally provided, in accordance with an embodiment of the present invention, an apparatus, including a memory and a processor. The memory is configured to hold (i) an operating-temperature profile of a hardware processing sub-unit (HPSU) of a network element as a function of time, and (ii) a dependence of an Equivalent Reliability Time (ERT) of the HPSU on operating temperature. The processor is configured to weight the operating-temperature profile using the dependence of the ERT on operating temperature, to estimate an effective ERT of the HPSU, and to modify an operating condition of the HPSU in the network element depending on the effective ERT.

There is further provided, in accordance with an embodiment of the present invention, a computer software product, the product including a tangible non-transitory computer-readable medium in which program instructions are stored, which instructions, when read by a processor, cause the processor to: (a) read from a memory (i) an operating-temperature profile of a hardware processing sub-unit (HPSU) of a network element as a function of time, and (ii) a dependence of an Equivalent Reliability Time (ERT) of the HPSU on operating temperature, and (b) weight the operating-temperature profile using the dependence of the ERT on operating temperature, to estimate an effective ERT of the HPSU, and to modify an operating condition of the HPSU in the network element depending on the effective ERT.

The present invention will be more fully understood from the following detailed description of the embodiments thereof, taken together with the drawings in which:

DETAILED DESCRIPTION OF EMBODIMENTS

Overview

Figure 1:
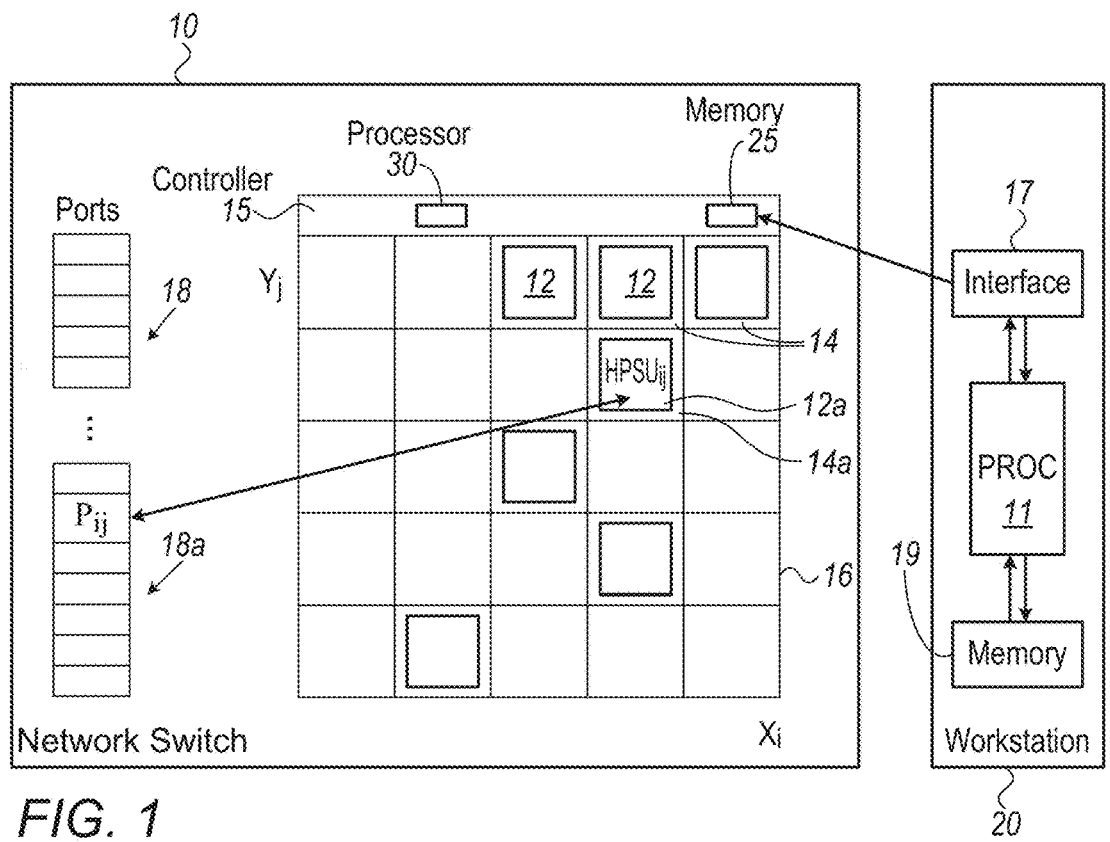
FIG. 1 is a schematic block diagram of a portion of a network switch comprising multiple hardware processing sub-units (HPSUs) 12 and I/O ports, and of a workstation, in accordance with an embodiment of the present invention.

Hardware processing sub-units (HPSUs) in high-end electronic cards, such as in network switches, are required to process high volumes of data packets, and therefore typically operate under high workload conditions. Consequently, such HPSUs, which may be located, for example, in different regions of a semiconductor die or on different semiconductor dies in a network element (e.g., a network switch), have to function reliably during periods of peak temperature of the semiconductor die (or of regions in a die). Moreover, the HPSUs are required to function reliably during periods in which the temperature of the semiconductor die peaks for various other possible reasons than elevated data rates, such as due to disruptions in cooling.

A common measure of HPSU performance and reliability is a maximal semiconductor (e.g., silicon) die temperature (also known as maximal "t-junction") experienced by the HPSU. The maximal semiconductor die temperature is defined herein as the peak temperature of the HPSU in a scenario of extreme conditions, such as of high ambient temperature, occurrences of disruptions in cooling (e.g., fan failures), and peaks in rate of data traffic.

Another measure of HPSU reliability is referred to as equivalent reliability time (ERT). The ERT is typically specified in years, and indicates the expected reliable lifetime of the HPSU under certain operating conditions. The silicon die temperature is closely related to the ERT rating of the HPSU via, for example, degrading thermoelectrical effects in metals and semiconductors. Thus, a vendor usually issues with a produced HPSU, a relation (e.g., a conversion table that converts semiconductor die temperature to ERT) that gives the ERT of the HPSU as a function of semiconductor die temperature. Typically, the processor's factory stated ERT rating is 10 years for a given nominal semiconductor die temperature that the factory specifies.

Typically, a network switch comprises multiple Input/Output (I/O) ports, which are coupled to multiple HPSUs inside the network switch. Varying patterns of data traffic between ports and HPSUs may directly affect an actual ERT rating of an HPSU. For example, when an HPSU receives and/or transmits small size packets, the rate of packets that the HPSU processes peaks, which may cause the semiconductor die temperature to peak at the location of the HPSU and correspondingly to cause a (temporary) drop in the ERT of the HPSU. This variability, combined with varying ambient conditions, make the actual ERT rating of the HPSU time dependent and hard to estimate.

A consistently underestimated ERT of an HPSU, due to overconcerns of possible HPSU failures, may lead to setting the HPSUs of a network switch to underperform. A consistently overestimated ERT of the HPSU may lead to erroneously setting the HPSUs of a network switch to overperform which may lead to failures of HPSUs in the field. It is therefore important to estimate the ERT of an HPSU as accurately as possible.

Embodiments of the present invention that are described hereinafter provide a method that enables accurate estimation of an effective ERT of an HPSU. subsequently, the disclosed method compares the effective ERT to a factory stated ERT rating, and, doing so, enables efficient management (e.g., adjustment) of data traffic rates experienced by the HPSU, and/or adjustment of a cooling capacity to the HPSU. When using the disclosed technique, maximal performance can be obtained from the HPSU while complying with a prespecified reliability rating requirement from the HPSU.

The disclosed method enables the HPSUs to operate at elevated t-junction values while ensuring that each HPSU maintains, on average, a prespecified ERT rating (e.g., an ERT rating of 10 years).

The disclosed effective ERT is typically calculated as a weighted average over time of a time dependent ERT profile. In an embodiment, the effective ERT is calculated as a modified weighted average, for example by giving periods of high silicon die temperatures larger weight than to periods of low silicon die temperatures. In some embodiments the weighting is calculated according to the actual values of the die temperature over time.

In some embodiments, the disclosed method includes obtaining (i) an operating-temperature profile of a hardware processing sub-unit (HPSU) of a network element as a function of time, and (ii) a dependence of an ERT of the HPSU on operating temperature. The method further includes weighting over time the operating-temperature profile using the dependence of the ERT on operating temperature, to estimate an effective ERT of the HPSU. In an embodiment, an actual temperature profile, as measured over time during field operation, is extrapolated (e.g., assumed to be repeating itself to cover a span of 10 years), and based on the extrapolation over actual temperature, the effective ERT is recalculated. Based on the recalculated ERT, an operating condition of the HPSU in the network element is modified, depending on the recalculated effective ERT.

Typically, modifying the operating condition includes modifying an amount of the communication traffic assigned for processing by the HPSU and/or modifying an intensity of cooling applied to the HPSU. However, other operating conditions may be modified, such as reducing a speed of a physical layer, or in rare case, temporarily shutting down a port.

In general, modifying the operating condition can be performed during a design of the network element and/or during field operation of the network element, as described below.

In some embodiments, a processor (e.g., of a design workstation or in the field) compares the effective ERT to a prespecified effective ERT, and (a) if the effective ERT is higher than the prespecified ERT by more than a given tolerance, performs at least one of increasing a maximally allowed data traffic rate between a port of the network element and the HPSU and decreasing a cooling capacity to the HPSU, or (b) if the effective ERT is lower than the prespecified ERT by more than the given tolerance, performs at least one of decreasing the a maximally allowed data traffic rate between the port and the HPSU and increasing a cooling capacity to the HPSU.

In some embodiments, the HPSU is located at a given region of a semiconductor die inside the network element and cooling the HPSU means cooling a semiconductor die. Increasing the maximally allowed data traffic rate between the port and the HPSU comprises operating the HPSU at an increased semiconductor die temperature value at the given region.

In some embodiments, obtaining the operating-temperature profile of the HPSU comprises deriving the time dependent semiconductor die temperature profile using a log of ambient events that each causes a documented variation in die temperature. The log of ambient events may include a log of ambient temperature and a log of periods of fan-failures.

In the field, in some embodiments, the disclosed method further includes monitoring an actual die-temperature profile at the given region of a semiconductor die where an HPSU is located. Based on the monitored die-temperature profile, the effective ERT of the HPSU is calculated and compared to the prespecified ERT. According to the comparison, at least one of the above steps (a) and (b) is performed, depending if the calculated effective ERT is higher or lower than the prespecified ERT by more than the given tolerance.

In some embodiments, obtaining the operating-temperature profile of the HPSU comprises deriving the operating-temperature profile using at least a time dependent profile of data traffic rate between a port of the network element and the HPSU.

In some embodiments, a software (SW) product comprising a model and an algorithm are provided for a processor running the software to conduct each of the processor related steps and functions outlined above. The processor derives the die-temperature profile using a thermal model, using a set of inputs for the model, such as, in addition to patterns of data traffic rates, logs of ambient events, each of which may cause a documented variation in die temperature. Examples of documented events include a log of ambient temperature and a log of fan failure records.

Without the disclosed method, designers and/or users may prefer to maintain the HPSUs at consistently lower t-junction values than actually possible, from fear of failures, meaning setting lower performance of network switches. Using the disclosed method, the performance of network switch may be, for example, enhanced in order to reduce a tool large reliability margin in HPSUs operation, so as to enhance HPSUs performance. As another example, the disclosed method may be used for decreasing a frequency of scheduled maintenance of a system comprising numerous network switches. In another example, the disclosed method may be used for relaxing cooling requirements of network switches. In an opposite example, the disclosed method may lead to increasing a cooling capacity at different locations of inside network switches to protect the network switches from potential failures.

Furthermore, the disclosed reliability estimation method can be utilized by a manufacturer, for example, using an effective ERT value derived by the disclosed method, to produce more cost-effective network switches, by more accurately balancing between reliability rating requirements and performance requirements.

Raising Maximal Silicon Die Temperature Using Reliability Model

FIG. 1 is a schematic block diagram of a portion of a network switch 10 comprising multiple hardware processing sub-units (HPSUs) 12 and I/O ports 18, and of a workstation 20, in accordance with an embodiment of the present invention. HPSUs 12 are located at respective regions 14 of a semiconductor die 16 (shown as squares having center coordinates $(X_i,Y_j)$).

While a single semiconductor die 16 is schematically shown, it should be understood that multiple semiconductor dies may be integrated in a single chip on network switch 10, or on multiple chips that are assembled on network switch 10. In some embodiments, all HPSUs in a given chip are identical. Alternatively, a given chip may comprise HPSUs that differ from one another.

In the shown embodiment, each of HPSUs 12, such as HPSU 12a (marked as $HPSU_{ij}$) in region 14a, is uniquely coupled to an I/O port out of numerous I/O ports 18 of the network switch, such as to I/O port 18a (marked as $P_{ij}$). Thus, HPSU 12a uniquely processes packets that are received from port 18a and outputs the processed data to port 18a. Adjusting the data traffic through a port like port 18a has therefore a direct impact on the workload experienced by HPSU 12a. In general, I/O ports and HPSU are dynamically managed resources, and in such cases, the disclosed method is applied, mutatis mutandis, to reflect an actual workload of each HPSU, due to, for example, receiving data packets from several I/O ports, and to derive accordingly the time dependent ERT profile of the HPSU. In some cases, the data traffic is adjusted in the HPSU (e.g., to meet reliability requirements on the HPSU) without relation to a specific port, while port management is performed elsewhere.

In some embodiments, during a design session, using logs received via an interface 17, a processor 11 of workstation 20 derives time dependent die temperature profiles, $T_n^{ij}=T_n(X_i,Y_j)$, for the multiple regions 14 on die 16. The integer n serves a discrete time axis. Processor 11 saves the die temperature profiles in a memory 19 of workstation 20.

Workstation 20 comprising processor 11, interface 17 and memory 19 can program, e.g., via interface 17 and a link 35, a controller 15 of switch 10 (e.g., to store in a memory 25 of controller 15 data traffic rates and/or cooling capacities settings) to enable controller 15 to manage the operation of the switch, during actual operation in the field. In particular controller 15 is programmed to control the allocation of traffic to HPSUs based on die-temperature (i.e., carries out the method described by FIG. 6).

Using time dependent die profiles $T_n^{ij}$, processor 11 derives respective time dependent ERT profiles for regions 14, $ERT_n^{ij}=ERT_n(X_i,Y_j)$. By averaging $ERT_n^{ij}$ over respective durations $D_n$ of die temperatures experienced by the HPSU, the disclosed method provides a single predictive measure of reliability of an HPSU at any silicon die location, the effective ERT:

$$\text{effective\_ERT}^{ij} = \frac{\sum ERT_n^{ij} \cdot D_n}{\sum D_n}, \quad \text{Eq. 1}$$

where $D_n$ are durations for which the respective $ERT_n^{ij}$ values were derived. In an embodiment, a modified weighted average may be used, for example by giving periods $D_n$ of high silicon die temperatures larger weight, $w_n$, than to periods $D_n$ of low silicon die temperatures:

$$\text{weighted\_effective\_ERT}^{ij} = \frac{\sum ERT_n^{ij} \cdot w_n \cdot D_n}{\sum w_n \cdot D_n}, \quad \text{Eq. 2}$$

In Eq. 2, the weights $w_n$, may be derived empirically, based on past reliability data. For example, using a nominal operating temperature of 110° C., a same duration of operation in 80° C. and 140° C. will typically not cancel each other in a weighted effective ERT calculation according to Eq. 2. Rather, the duration in which the HPSU experiences 140° C. will be weighted with a larger coefficient w.

In the disclosed design method, the processor adjusts data traffic rates and/or cooling capacities settings so HPSUs 12 on respective regions 14 on silicon die 16 would have an effective\_$ERT^{ij}$ value that equals, up to a given tolerances, a prespecified ERT value. An example design flow along the guideline described above is shown in FIG. 5.

The configuration of switch 10 and its various elements shown in FIG. 1 is an example configuration, which is chosen purely for the sake of conceptual clarity. In alternative embodiments, any other suitable configuration can be used.

The different elements of switch 10 may be implemented using suitable software, using suitable hardware, e.g., using one or more Application-Specific Integrated Circuits (ASICs) or Field-Programmable Gate Arrays (FPGAs), or using a combination of hardware and software elements.

In some embodiments, processor 30 of switch 10 and/or processor 11 of workstation 20 is implemented using one or more general-purpose processors, which are programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Figure 2A:
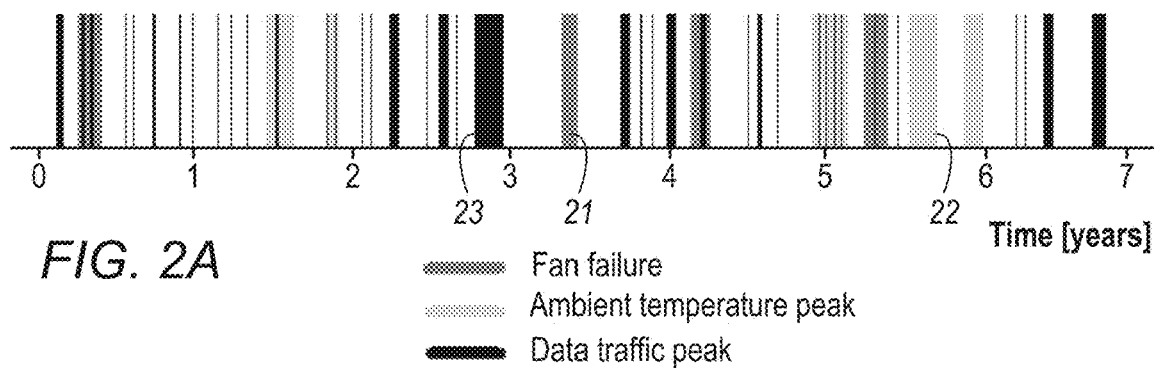
FIGS. 2A and 2B are schematic plots of a temporal pattern of events that affect semiconductor die temperature and of a corresponding time dependent semiconductor die temperature profile, respectively, in accordance with an embodiment of the present invention.
Figure 2B:
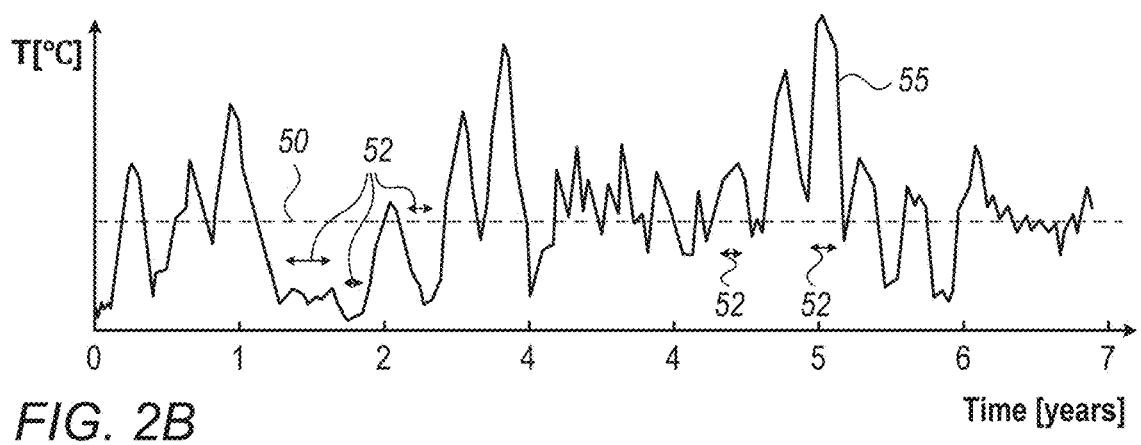

FIGS. 2A and 2B are schematic plots of a temporal pattern of events that affect semiconductor die temperature and of a corresponding time dependent semiconductor die temperature profile, respectively, in accordance with an embodiment of the present invention. The patterns (e.g., logs) shown in FIG. 2A are occurrences over time of events potentially adverse to processor reliability. The events shown in FIG. 2A are divided into periods of (a) fan failures 21, (b) peaks in ambient temperature 22, and (c) peaks in volume of data traffic 23. As seen, events of different type may overlap in time. The frequency of events is highly reduced, for clarity of presentation. In practice some events may take any time between a fraction of a second and many hours.

FIG. 2B shows a time dependent semiconductor die-temperature profile 55 calculated correspondingly to the events of FIG. 2A, using a thermal model.

As seen, at some durations 52, $D_n$, the semiconductor die temperature exceeds a nominal die temperature 50 that, for example, a manufacturer of the HPSU specified (e.g., die temperature at which the ERT is rated at 10 years). At other durations 52, the semiconductor die temperature falls below nominal temperature 50.

In an embodiment, processor 11 derives die-temperature profile 55 by calculating a time dependent electrical power consumption profile of the HPSU for which profile 55 is calculated and, according to the electrical power consumption profile and other inputs (e.g., geometry, heat capacities, cooling rates), the processor applies a thermal simulation to derive resulting die-temperature profile 55.

The temperature profile in FIG. 2B is also highly simplified for the sake of clarity of presentation. In practice, a change in temperature may take any time between a fraction of a second and a drift over many hours.

Figure 3:
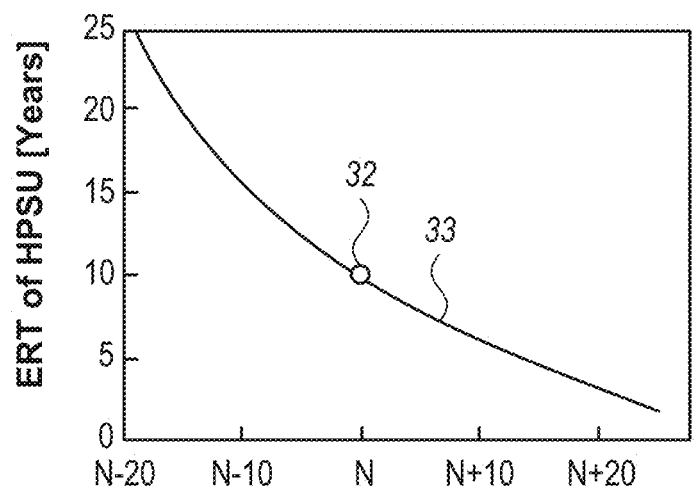
FIG. 3 is a schematic graph of an equivalent reliability time (ERT) of a processor as a function of silicon die temperature, in accordance with an embodiment of the present invention.

FIG. 3 is a schematic graph of an equivalent reliability time (ERT) 33 of an HPSU 12 as a function of semiconductor die temperature, in accordance with an embodiment of the present invention. The graph shows how ERT 33 varies with semiconductor die temperature about a nominal die temperature 32 "N" at which the processor is rated as having an ERT equaling 10 years. By way of example, the nominal ERT is rated 10 years at a nominal die temperature 32 of 110° C. However, the nominal ERT and nominal die temperature 32 values will vary with type of semiconductor chips (e.g., silicon chips).

Typically, in the disclosed method, the nominally rated ERT is the prespecified value to which the averaged ERT (i.e., the effective ERT of the HPSU on the die) is compared to. As seen, a die temperature increase by 10° C. above nominal temperature 32 shortens the expected reliable lifetime (i.e., ERT rating) of the HPSU to five years. On the other hand, if the HPSU is operated at a silicon die-temperature that is 10° C. below nominal temperature 32 the ERT rating is prolonged to fifteen years.

Figure 4:
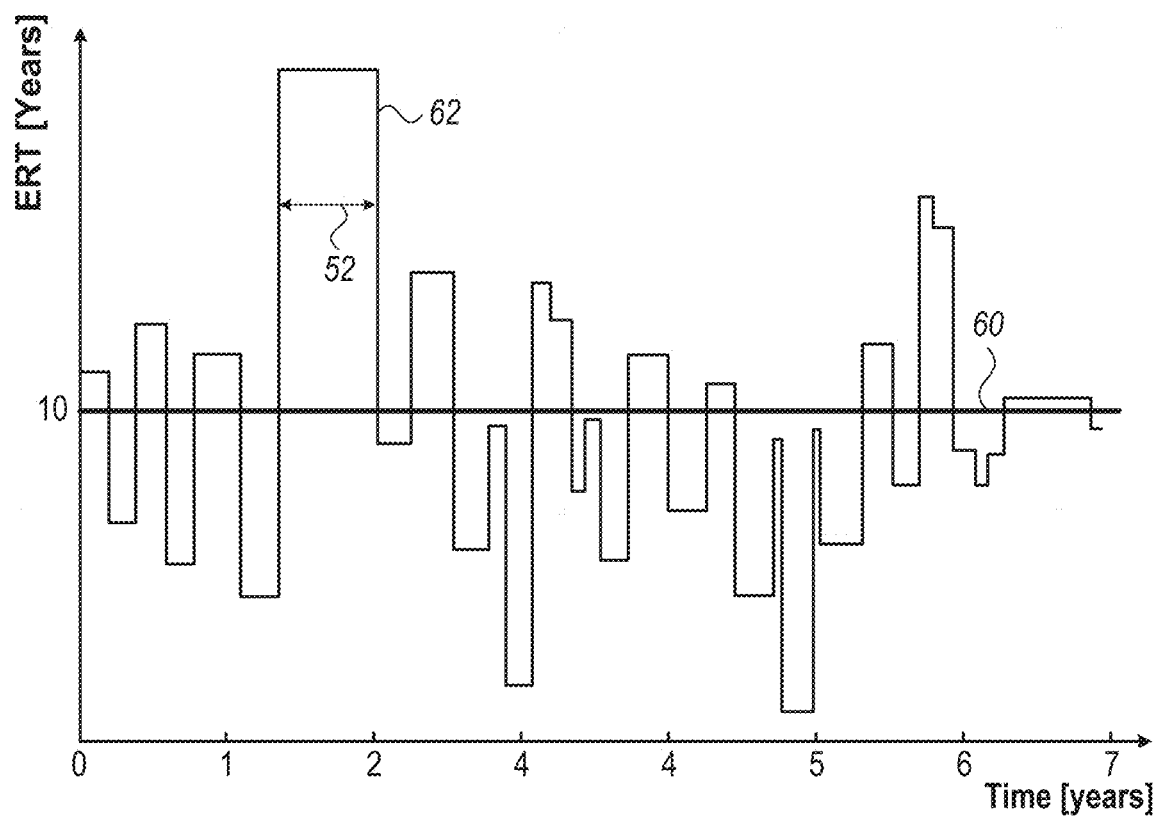
FIG. 4 is a schematic graph of a time dependent equivalent reliability time (ERT) profile of a hardware processing sub-unit (HPSU), in accordance with an embodiment of the present invention.

FIG. 4 is a schematic graph of a time dependent equivalent reliability time (ERT) profile 62 of a hardware processing sub-unit (HPSU), in accordance with an embodiment of the present invention. The graph is schematically drawn to qualitatively match temperature profile 55 of FIG. 2B using relation 33 (i.e., conversion graph) of FIG. 3 from semiconductor die temperature values to ERT values.

As seen, ERT profile 62 of an HPSU is a variable quantity over years of operation, when at some durations 52, $D_n$, the ERT rating exceeds the 10-year nominal value 60 brought by way of example, while at other durations 52, the ERT falls below the 10-year nominal value 60 of the ERT. In the particular case seen in FIG. 4, the ERT is typically under the nominal ERT value 60 of 10 years at most times, meaning the effective ERT of that HPSU, as calculated by Eq. 1, would be below a nominally specified ERT of 10 years. This result, which may have adverse effect for a client using the HPSU under condition reflected by temperature profile 55, may invoke design change to mitigate possibility of processor failure, as described in the design flow chart of FIG. 5.

Figure 5:
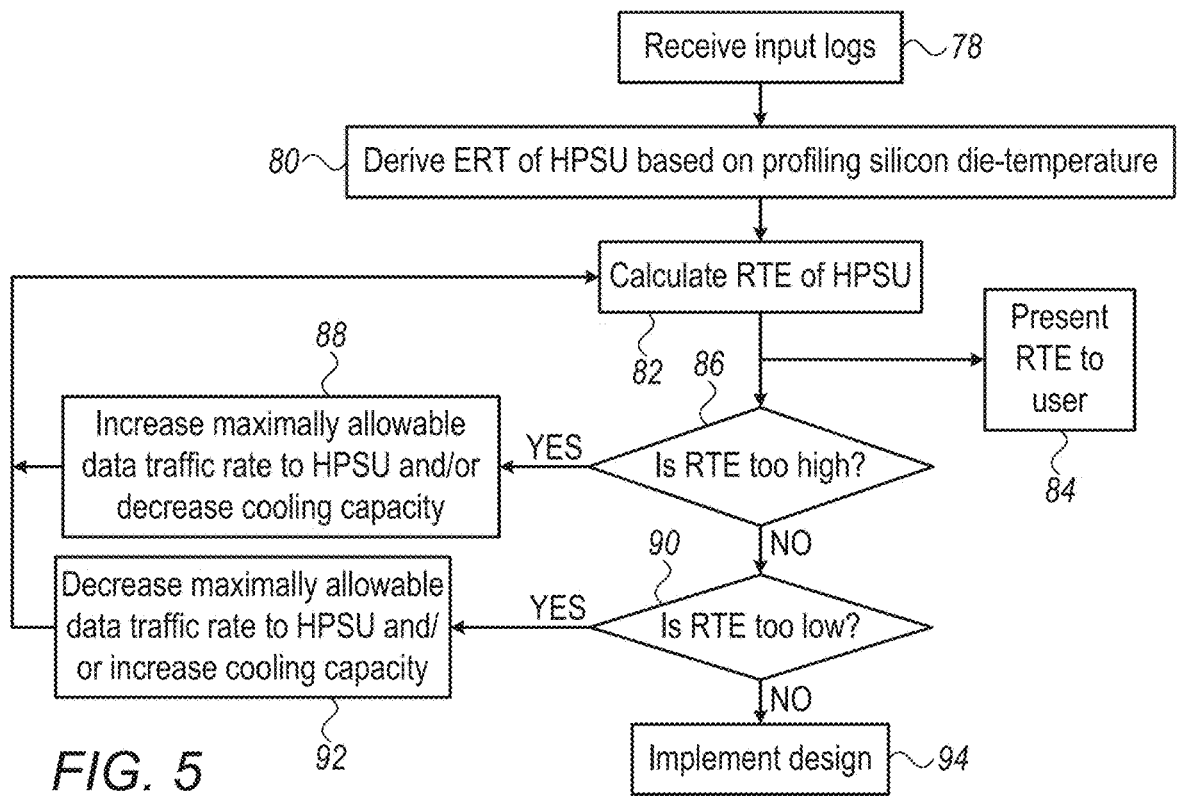
FIG. 5 is a flow chart that schematically illustrates a design method for optimizing a use of a hardware processing sub-unit (HPSU) operation, in accordance with an embodiment of the present invention.

FIG. 5 is a flow chart that schematically illustrates a design method for optimizing a use of a hardware processing sub-unit (HPSU) operation, in accordance with an embodiment of the present invention. The process begins at an input logs receiving step 78, in which with interface 17 of workstation 20 receives logs such as: a time dependent profile of data traffic rate between a port of the network switch and an HPSU, of ambient temperature, and of cooling disruptions.

Next, processor 11, applies the disclosed method and algorithm to the input logs, to derive an expected die-temperature profile 55 and, based on the die-temperature profile, to derive a respective ERT profile 62 of the HPSU, at an ERT estimation step 80. Next, using derived ERT profile 62, processor 11 calculates the expected effective ERT of the HPSU, at an effective ERT calculation step 82. Processor 11 presents the resulting effective ERT of the HPSU to a user at an effective ERT presenting step 84.

Next, processor 11 compares the calculated effective ERT value of the HPSU with the prespecified ERT value, at an ERT checking step 86. If the calculated effective ERT value is higher than the prespecified ERT value by more than a given tolerance, meaning that the planned HPSU reliability rating is too high than required and that the HPSU is planned for under performance, processor 11 adjusts the use of the HPSU, at an HPSU use adjustment step 88. Step 88 may comprise increasing the maximally allowable data traffic rate to the HPSU and/or increasing a designed cooling capacity to the HPSU. In other embodiments, in which data traffic is dynamically allocated between different ports to a same HPSU, processor 11 may adjust the use of the HPSU by allocating more ports to the HPSU.

Subsequently processor 11 loops back to effective ERT calculation step 82, to provide a resulting effective ERT.

If, on the other hand, at an effective ERT checking step 90, the calculated effective ERT value is lower than the prespecified ERT value by more than the given tolerance, meaning that the reliability rating of the HPSU is below the requirement, processor 11 adjusts accordingly the use of the HPSU, at an HPSU use adjustment step 92. Step 92 may comprise decreasing the maximally allowable data traffic rate to the HPSU and/or increasing a designed cooling capacity to the HPSU. In other embodiments, in which data traffic is dynamically allocated between different ports to a same HPSU, processor 11 may adjust the use of the HPSU by allocating less ports to the HPSU.

Subsequently processor 11 loops back to effective ERT calculation step 82, to provide a resulting effective ERT.

Finally, when the calculated effective ERT value equals the prespecified ERT value within the given tolerance, processor 11 implements the design, for example, by programming controller 15 of switch 10 as described in FIG. 1, at a design implementation step 94.

The flow chart brought in FIG. 5 is highly simplified for the simplicity and clarity of presentation. In actual implementations, the process may include notifying a user and receiving a user permission for design changes.

Figure 6:
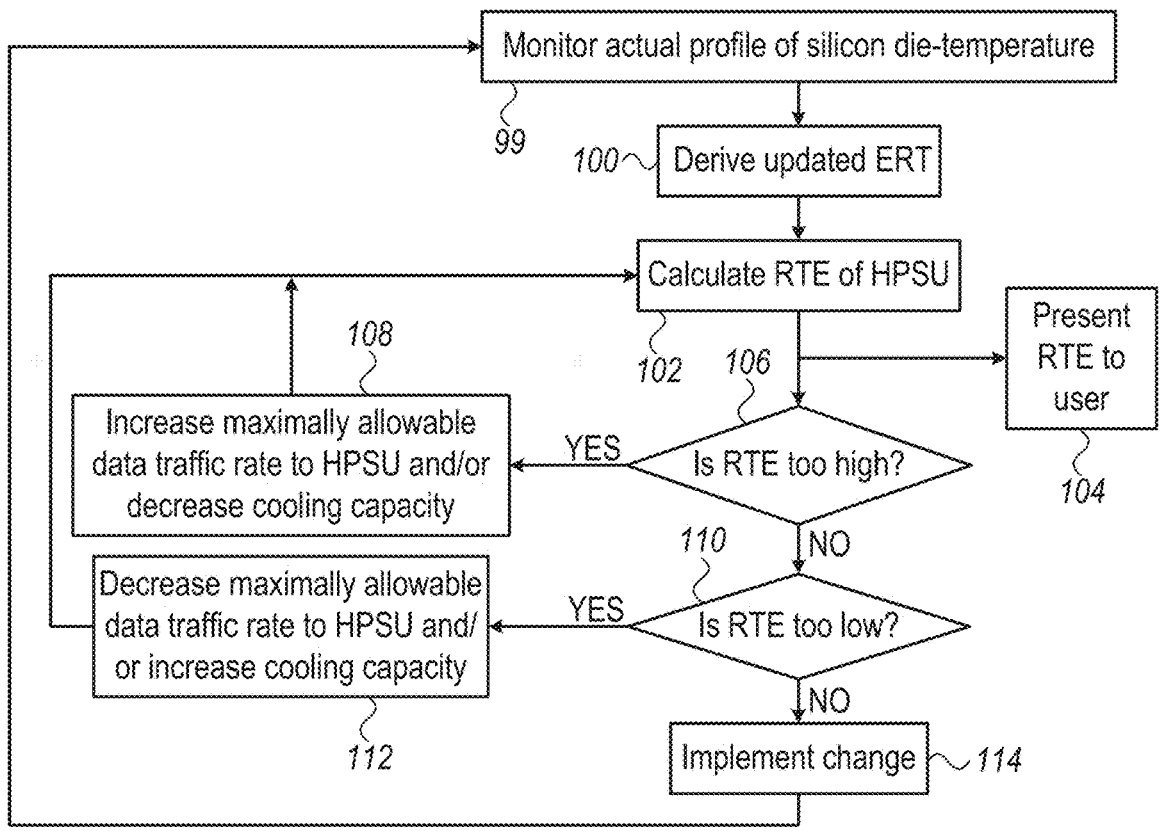
FIG. 6 is a flow chart that schematically illustrates a method for management of a hardware processing sub-unit (HPSU) during actual use, in accordance with an embodiment of the present invention.

FIG. 6 is a flow chart that schematically illustrates a method for management of a hardware processing sub-unit (HPSU) during actual use, in accordance with an embodiment of the present invention. During HPSU actual operation, an actual die temperature is monitored, e.g., by a processor 30 of controller 15 receiving a log comprising of the die temperature from one or more temperature sensors on the die a time dependent profile. Processor 30 uses the logged temperature data to calculate an actual time dependent die-temperature profile, at a die-temperature monitoring step 99. Based on the monitored die-temperature profile, processor 30 then derives an updated ERT profile, at an updated ERT derivation step 100.

At an effective ERT calculation step 102, using the updated ERT profile, processor 11 applies the disclosed algorithm to recalculate an updated effective ERT. Processor 30 presents the calculated effective ERT to a user at an effective ERT presenting step 104.

Next, processor 30 compares the calculated effective ERT value with the prespecified ERT value, at an effective ERT checking step 106. If the calculated effective ERT value is higher than the prespecified ERT value by more than a given tolerance, meaning that the actual HPSU reliability rating is too high than required and that the HPSU is under performing, processor 30 adjusts the use of the HPSU, at an HPSU use adjustment step 108. Step 108 may comprise increasing the maximally allowable data traffic rate to the HPSU and/or increasing a designed cooling capacity to the HPSU. In other embodiments, in which data traffic is dynamically allocated between different ports to a same HPSU, processor 30 may adjust the use of the HPSU by allocating more ports to the HPSU.

Subsequently processor 30 loops back to effective ERT calculation step 102, to provide the algorithm an updated effective ERT.

If, on the other hand, at an effective ERT checking step 110, the calculated effective ERT value is lower than the prespecified ERT value by more than the given tolerance, meaning that the reliability rating of the HPSU is below the requirement, the processor adjust accordingly the use of the HPSU, at an HPSU use adjustment step 112. Step 112 may comprise decreasing the maximally allowable data traffic rate to the HPSU and/or increasing an actual cooling capacity to the HPSU. In other embodiments, in which data traffic is dynamically allocated between different ports to a same HPSU, processor 30 may adjust the use of the HPSU by allocating less ports to the HPSU.

Subsequently processor 11 loops back to effective ERT calculation step 102, to an updated effective ERT value.

Finally, when the calculated effective ERT value equals the prespecified ERT value within the given tolerance, processor 30 implements the change, at a change implementation step 114.

The flow chart brought in FIG. 6 is highly simplified for the simplicity and clarity of presentation. In actual implementations, the process may include alerting a user and receiving a user permission for actual changes. Furthermore, in response to a calculated effective ERT that is below a prespecified value, a processor may run an algorithm configured to identify at least one malfunctioning element of the network switch.

The disclosed process may run automatically and autosave logged data and actions and a log of respective preventive measures and/or corrective measures taken automatically, which the user may later access.

Although the embodiments described herein mainly address communication network applications, the methods and systems described herein can also be used in enhancing reliability of HPSUs for other applications, such as automotive, gaming, artificial intelligence (AI), and medical fields.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
obtaining (i) an operating-temperature profile of a hardware processing sub-unit (HPSU) of a network element as a function of time, and (ii) a dependence of an Equivalent Reliability Time (ERT) of the HPSU on operating temperature;
weighting the operating-temperature profile using the dependence of the ERT on operating temperature, to estimate an effective ERT of the HPSU; and
modifying an operating condition of the HPSU in the network element, depending on the effective ERT.

2. The method according to claim 1, wherein modifying the operating condition comprises modifying an amount of the communication traffic assigned for processing by the HPSU.

3. The method according to claim 1, wherein modifying the operating condition comprises modifying an intensity of cooling applied to the HPSU.

4. The method according to claim 1, wherein modifying the operating condition is performed during a design of the network element.

5. The method according to claim 4, wherein modifying the operating condition comprises changing a requirement in the design.

6. The method according to claim 1, wherein modifying the operating condition is performed during field operation of the network element.

7. The method according to claim 1, wherein the HPSU is located at a given region of a semiconductor die inside the network element.

8. The method according to claim 1, wherein obtaining the operating-temperature profile of the HPSU comprises deriving an operating-temperature profile dependent on the profile of the data traffic rate between a port of the network element and the HPSU.

9. The method according to claim 1, wherein modifying an operating condition of the HPSU in the network element, depending on the effective ERT, comprises:
comparing the effective ERT to a prespecified effective ERT;
if the effective ERT is higher than the prespecified ERT by more than a given tolerance, performing at least one of increasing a maximally allowed data traffic rate between a port of the network element and the HPSU and decreasing a cooling capacity to the semiconductor die; and
if the effective ERT is lower than the prespecified ERT by more than the given tolerance, performing at least one of decreasing the a maximally allowed data traffic rate between the port and the HPSU and increasing a cooling capacity to the semiconductor die.

10. The method according to claim 9, wherein increasing the maximally allowed data traffic rate between the port and the HPSU comprises operating the HPSU at an increased semiconductor die temperature value.

11. The method according to claim 1, wherein obtaining the operating-temperature profile of the HPSU comprises deriving the operating-temperature profile from a log of ambient events that each causes a documented variation in the operating temperature.

12. The method according to claim 11, wherein the log of ambient events comprises a log of ambient temperature and a log of periods of fan-failures.

13. The method according to claim 1, wherein obtaining the dependence of the ERT of the HPSU on operating temperature comprises applying a relation that converts semiconductor die temperature to ERT.

14. The method according to claim 1, wherein obtaining the operating-temperature profile of the HPSU comprises monitoring an actual die-temperature profile at a given region of a semiconductor die.

15. The method according to claim 1, and comprising alerting a user if the effective ERT is lower than a prespecified ERT.

16. The method according to claim 1, and comprising, in response to the effective ERT, running an algorithm configured to identify at least one malfunctioning component of the network element.

17. The method according to claim 1, and comprising:
measuring an actual temperature over time during field operation;
extrapolating in time an actual temperature profile;
based on the extrapolated temperature profile, recalculating the effective ERT; and based on the recalculated ERT, modifying the operating condition of the HPSU.

18. An apparatus, comprising:
a memory, configured to hold (i) an operating-temperature profile of a hardware processing sub-unit (HPSU) of a network element as a function of time, and (ii) a dependence of an Equivalent Reliability Time (ERT) of the HPSU on operating temperature; and
a processor, configured to weight the operating-temperature profile using the dependence of the ERT on operating temperature, to estimate an effective ERT of the HPSU, and to modify an operating condition of the HPSU in the network element depending on the effective ERT.

19. The apparatus according to claim 18, wherein the processor is configured to modify the operating condition by modifying an amount of the communication traffic assigned for processing by the HPSU.

20. The apparatus according to claim 18, wherein the processor is configured to modify the operating condition by modifying an intensity of cooling applied to the HPSU.

21. The apparatus according to claim 18, wherein the processor is configured to modify the operating condition during a design of the network element.

22. The apparatus according to claim 21, wherein the processor is configured to modify the operating condition by changing a requirement in the design.

23. The apparatus according to claim 18, wherein the processor is configured to modify the operating condition during field operation of the network element.

24. The apparatus according to claim 18, wherein the HPSU is located at a given region of a semiconductor die inside the network element.

25. The apparatus according to claim 18, wherein the memory is configured to hold the operating-temperature profile of the HPSU by holding a derived operating-temperature profile that is dependent on the profile of the data traffic rate between a port of the network element and the HPSU.

26. The apparatus according to claim 18, wherein the processor is configured to modify an operating condition of the HPSU in the network element, depending on the effective ERT, by:
comparing the effective ERT to a prespecified effective ERT;
if the effective ERT is higher than the prespecified ERT by more than a given tolerance, performing at least one of increasing a maximally allowed data traffic rate between a port of the network element and the HPSU and decreasing a cooling capacity to the semiconductor die; and
if the effective ERT is lower than the prespecified ERT by more than the given tolerance, performing at least one of decreasing the a maximally allowed data traffic rate between the port and the HPSU and increasing a cooling capacity to the semiconductor die.

27. The apparatus according to claim 26, wherein the processor is configured to increase the maximally allowed data traffic rate between the port and the HPSU by operating the HPSU at an increased semiconductor die temperature value.

28. The apparatus according to claim 18, wherein the memory is configured to hold the operating-temperature profile of the HPSU by holding the operating-temperature profile derived from a log of ambient events that each causes a documented variation in the operating temperature.

29. The apparatus according to claim 28, wherein the log of ambient events comprises a log of ambient temperature and a log of periods of fan-failures.

30. The apparatus according to claim 18, wherein the memory is configured to hold the dependence of the ERT of the HPSU on operating temperature derived by applying a relation that converts semiconductor die temperature to ERT.

31. The apparatus according to claim 18, wherein the memory is configured to hold the operating-temperature profile of the HPSU received by monitoring an actual die-temperature profile at a given region of a semiconductor die.

32. The apparatus according to claim 18, and wherein the processor is further configured to alert a user if the effective ERT is lower than a pre-specified ERT.

33. The apparatus according to claim 18, wherein the processor is further configured to, in response to the effective ERT, run an algorithm configured to identify at least one malfunctioning component of the network element.

34. The apparatus according to claim 18, and wherein the processor is further configured to:
measure an actual temperature over time during field operation;
extrapolate in time an actual temperature profile;
based on the extrapolated temperature profile, recalculate the effective ERT; and
based on the recalculated ERT, modify the operating condition of the HPSU.

35. A computer software product, the product comprising a tangible non-transitory computer-readable medium in which program instructions are stored, which instructions, when read by a processor, cause the processor to:
read from a memory (i) an operating-temperature profile of a hardware processing sub-unit (HPSU) of a network element as a function of time, and (ii) a dependence of an Equivalent Reliability Time (ERT) of the HPSU on operating temperature; and
weight the operating-temperature profile using the dependence of the ERT on operating temperature, to estimate an effective ERT of the HPSU, and to modify an operating condition of the HPSU in the network element depending on the effective ERT.

* * * * *